United States Patent
Kogo

(10) Patent No.: US 9,236,165 B2
(45) Date of Patent: Jan. 12, 2016

(54) ELECTRIC CABLE

(75) Inventor: Kousuke Kogo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/005,922

(22) PCT Filed: Feb. 24, 2012

(86) PCT No.: PCT/JP2012/001303
§ 371 (c)(1),
(2), (4) Date: Sep. 18, 2013

(87) PCT Pub. No.: WO2012/127785
PCT Pub. Date: Sep. 27, 2012

(65) Prior Publication Data
US 2014/0031474 A1 Jan. 30, 2014

(30) Foreign Application Priority Data
Mar. 22, 2011 (JP) ................................. 2011-062390

(51) Int. Cl.
*H01B 3/30* (2006.01)
*H01B 7/295* (2006.01)
*H01B 3/28* (2006.01)
*H01B 3/44* (2006.01)
*C08L 23/02* (2006.01)
*C08L 23/12* (2006.01)
*C08L 21/00* (2006.01)
*C08K 5/00* (2006.01)
*C08L 23/26* (2006.01)
*C08K 5/136* (2006.01)
*C08K 3/22* (2006.01)
*C08L 23/16* (2006.01)
*C08K 3/00* (2006.01)
*C08K 3/20* (2006.01)

(52) U.S. Cl.
CPC .................. *H01B 3/307* (2013.01); *H01B 3/28* (2013.01); *H01B 3/441* (2013.01); *H01B 7/295* (2013.01); *C08K 3/0058* (2013.01); *C08K 3/20* (2013.01); *C08K 5/0066* (2013.01); *C08K 5/136* (2013.01); *C08K 2003/2224* (2013.01); *C08K 2003/2227* (2013.01); *C08L 21/00* (2013.01); *C08L 23/025* (2013.01); *C08L 23/12* (2013.01); *C08L 23/16* (2013.01); *C08L 23/26* (2013.01)

(58) Field of Classification Search
None
See application file for complete search history.

(56) References Cited

U.S. PATENT DOCUMENTS

| 4,622,350 | A | * | 11/1986 | Icenogle et al. | ............... 523/200 |
| 5,650,205 | A | * | 7/1997 | Shukushima | ................ 428/35.8 |
| 6,852,921 | B1 | * | 2/2005 | Koike et al. | ...................... 174/36 |
| 2007/0078211 | A1 | * | 4/2007 | Chang et al. | .................. 524/436 |
| 2010/0286320 | A1 | * | 11/2010 | Ishiguro et al. | ............... 524/401 |
| 2014/0008099 | A1 | * | 1/2014 | Kogo | ..................... 174/110 SR |

FOREIGN PATENT DOCUMENTS

| CN | 1939963 | A | 4/2007 |
| EP | 1092752 | A2 | 4/2001 |
| JP | H2-73838 | A | 3/1990 |
| JP | H11-21392 | A | 1/1999 |
| JP | 2007-204653 | A | 8/2007 |
| JP | 2009-40947 | A | 2/2009 |
| JP | 2009-51918 | A | 3/2009 |
| JP | 2011-233335 | A | 11/2011 |
| WO | 99/27015 | A1 | 6/1999 |
| WO | 2008/078406 | A1 | 7/2008 |

OTHER PUBLICATIONS http://www.westlake.com/_filelib/FileCabinet/Epolene/SalesSpecs/Epolene_E-43_sales_spec.pdf, Nov. 2012.*
The Chinese office action letter issued on Sep. 2, 2015 in the counterpart Chinese patent application.
The Chinese office action letter issued on Mar. 30, 2015 in the counterpart Chinese patent application.

* cited by examiner

*Primary Examiner* — Satya Sastri
(74) *Attorney, Agent, or Firm* — Marvin A. Motsenbocker; Mots Law, PLLC

(57) ABSTRACT

To provide an electric cable that can satisfy flame retardancy and battery fluid resistance in the CHFUS region provided in ISO 6722 and also satisfy low-temperature resistance, wear resistance, and peelability by using a halogen-containing flame retardant. An electric cable in which a coat layer is formed of a non-crosslinked resin composition that includes (A) 40 to 84 parts by mass of a polypropylene homopolymer, (B) 1 to 10 parts by mass of a polypropylene-based modified resin, (C) 10 to 30 parts by mass of a polyolefin-based copolymer, and (D) 5 to 20 parts by mass of an olefin-based elastomer and further includes 1 to 45 parts by mass of a metal hydroxide and 10 to 80 parts by mass of a halogen-containing flame retardant based on 100 parts by mass of the resins (A), (B), (C), and (D) in total.

8 Claims, No Drawings

ELECTRIC CABLE

TECHNICAL FIELD

The present invention relates to an electric cable and particularly to an electric cable that can satisfy flame retardancy and battery fluid resistance in the CHFUS region provided in ISO 6722 and also can satisfy low-temperature resistance and wear resistance.

BACKGROUND ART

As an insulating resin composition for covering an electric cable, especially an electric wire for automobiles, there is known, for example, a resin composition for an electric wire insulator wherein from 60 parts by mass to 90 parts by mass of a metal hydroxide has been blended to 100 parts by mass of a base resin composed of from 55 parts by mass to 98 parts by mass of a polyolefin-based polymer and the remainder of a polyamide and the polyamide is a copolymer of polyamide 6 with polyamide 66 (see Patent Literature 1). However, this resin composition has proved to have a problem that the added amount of magnesium hydroxide is so large that the resin composition cannot satisfy the battery fluid resistance according to ISO 6722 (2006 version).

Then, in order to satisfy the battery fluid resistance, studies for satisfying flame retardancy and battery fluid resistance without using magnesium hydroxide as much as possible were carried out, so that addition of a halogen-containing flame retardant was discovered (see, for example, Patent Literature 2). As a result, a blend system by which both battery fluid resistance and flame retardancy are satisfied simultaneously was discovered, but this caused an adverse influence, that is, a problem that low-temperature resistance and wear resistance deteriorate.

Besides, resin compositions provided with flame retardancy have been known (see, for example, Patent Literatures 3 to 5), but none of them can satisfy flame retardancy, battery fluid resistance, low-temperature resistance, wear resistance, and peelability simultaneously.

CITATION LIST

Patent Literature

[PTL 1]
Japanese Patent Application Laid-Open (JP-A) No. 2009-40947
[PTL 2]
JP-A No. 2-73838
[PTL 3]
JP-A No. 11-21392
[PTL 4]
JP-A No. 2007-204653
[PTL 5]
JP-A No. 2009-51918

SUMMARY OF INVENTION

Technical Problem

An object of the present invention is to provide an electric cable that can satisfy flame retardancy and battery fluid resistance in the CHFUS region provided in ISO 6722 and also satisfy low-temperature resistance, wear resistance, and peelability by using a halogen-containing flame retardant.

Solution to Problem

As a result of a variety of studies for attaining the aforementioned object, the present inventor found that bromine-containing flame retardants caused the deterioration of low-temperature resistance and wear resistance. However, if the quantity of a bromine-containing flame retardant is reduced, flame retardancy may deteriorate. Then, the inventor did further study and eventually accomplished the present invention by finding that a composition that satisfies the aforementioned properties can be obtained by controlling the blending amounts of a polypropylene homopolymer, a polypropylene-based modified resin, a polyolefin-based copolymer, and an olefin-based elastomer instead of reducing the quantity of a bromine-containing flame retardant.

The present invention that solves the aforementioned problems includes the following.

(1) An electric cable in which a coat layer is formed of a non-crosslinked resin composition that includes (A) 40 to 84 parts by mass of a polypropylene homopolymer, (B) 1 to 10 parts by mass of a polypropylene-based modified resin, (C) 10 to 30 parts by mass of a polyolefin-based copolymer, and (D) 5 to 20 parts by mass of an olefin-based elastomer and further includes 1 to 45 parts by mass of a metal hydroxide and 10 to 80 parts by mass of a halogen-containing flame retardant based on 100 parts by mass of the resins (A), (B), (C), and (D) in total.
(2) The electric cable according to the above (1), wherein the polypropylene-based modified resin (B) is one prepared by graft-copolymerizing maleic anhydride to a polypropylene-based resin.
(3) The electric cable according to the above (2), wherein the maleic anhydride has an acid value (JIS K0070) of 15 to 55.
(4) The electric cable according to the above (1), wherein the polypropylene-based modified resin (B) has a weight average molecular weight of 15,000 to 50,000.
(5) The electric cable according to the above (1), wherein the polyolefin-based copolymer (C) is a block copolymer of a propylene homopolymer with ethylene or 1-butene.
(6) The electric cable according to the above (1), wherein the metal hydroxide is magnesium hydroxide.
(7) The electric cable according to the above (6), wherein the magnesium hydroxide is magnesium hydroxide surface-treated with a fatty acid or a silane coupling agent.
(8) The electric cable according to the above (1), wherein the halogen-containing flame retardant is a bromine-containing flame retardant.
(9) The electric cable according to the above (8), wherein the bromine-containing flame retardant is tetrabromobisphenol A-bis(2,3-dibromopropyl ether).

Advantageous Effects of Invention

According to the present invention, it is possible to provide an electric cable that can satisfy flame retardancy and battery fluid resistance in the CHFUS region provided in ISO 6722 and also satisfy low-temperature resistance, wear resistance, and peelability by using a halogen-containing flame retardant.

DESCRIPTION OF EMBODIMENTS

The electric cable of the present invention is characterized in that a coat layer is formed of a non-crosslinked resin composition that includes (A) 40 to 84 parts by mass of a polypropylene homopolymer, (B) 1 to 10 parts by mass of a polypropylene-based modified resin, (C) 10 to 30 parts by mass of a polyolefin-based copolymer, and (D) 5 to 20 parts by mass of an olefin-based elastomer and further includes 1 to 45 parts by mass of a metal hydroxide and 10 to 80 parts by mass of a halogen-containing flame retardant based on 100 parts by mass of the resins (A), (B), (C), and (D) in total.

First, the respective components of the non-crosslinked resin composition of the present invention are described below.

<Non-Crosslinked Resin Composition>

((A) Polypropylene Homopolymer)

The blending amount of the polypropylene homopolymer to be used for the present invention is 40 to 84 parts by mass, preferably 50 to 80 parts by mass, and more preferably 60 to 70 parts by mass. If the blending amount is less than 40 parts by mass, wear resistance may be insufficient, and if it exceeds 84 parts by mass, low-temperature resistance may deteriorate.

[(B) Polypropylene-Based Modified Resin]

The polypropylene-based modified resin to be used for the present invention is one prepared by graft-copolymerizing maleic anhydride to a polypropylene-based resin. The polypropylene-based modified resin may be one produced by either of the melting process and the solution process. The acid value (JIS K0070) of the maleic anhydride is preferably 15 to 55 and more preferably 30 to 40. The weight average molecular weight of the polypropylene-based modified resin is preferably 15,000 to 50,000 and more preferably 20,000 to 40,000.

The blending amount of the polypropylene-based modified resin is 1 to 10 parts by mass and preferably 3 to 5 parts by mass. If the blending amount of the polypropylene-based modified resin is less than one part by mass, wear resistance and peelability may deteriorate. If the blending amount exceeds 10 parts by mass, no remarkable effects may be obtained.

((C) Polyolefin-Based Copolymer)

The polyolefin-based copolymer to be used for the present invention is preferably composed of one or two or more of known propylene (co)polymers, such as block copolymers of a propylene homopolymer with ethylene, 1-butene, or the like. These may be used singly or two or more of them may be used in combination. The polypropylene-based resin is not limited to these and polyolefin-based copolymers other than these may be used.

The blending amount of the polyolefin-based copolymer is 10 to 30 parts by mass and preferably 15 to 20 parts by mass. If the blending amount is less than 10 parts by mass, low-temperature resistance to insufficient, and if it exceeds 30 parts by mass, wear resistance may deteriorate.

((D) Olefin-Based Elastomer)

Examples of the olefin-based elastomer to be used in the present invention include propylene-ethylene random copolymers, propylene-alpha-olefin random copolymers, propylene-ethylene-alpha-olefin random copolymers, and mixtures of noncrystalline polyolefins with noncrystalline olefin-based copolymerized rubbers. In addition to the above, examples of a styrenic thermoplastic elastomer include block copolymers having an aromatic vinyl-based polymer block (hard segment) and a conjugated diene-based polymer block (soft segment) or random copolymers. Examples of an aromatic vinyl compound include styrene, alpha-alkyl-substituted styrenes, such as alpha-methylstyrene, alpha-ethylstyrene and alpha-methyl-p-methylstyrene, nucleus alkyl-substituted styrenes, such as o-methylstyrene, m-methylstyrene, p-methylstyrene, 2,4-dimethylstyrene, ethylstyrene, 2,4,6-trimethylstyrene, o-tert-butylstyrene, p-tert-butylstyrene, and p-cyclohexylstyrene. Examples of a conjugated diene compound include butadiene, isoprene, and methylpentadiene.

As other rubber components, diene rubbers, such as styrene-butadiene rubber (SBR), nitrile rubber (NBR), and butyl rubber (IIR), may be used.

The blending amount of the olefin-based elastomer is 5 to 20 parts by mass and preferably 10 to 15 parts by mass. If the blending amount is less than 5 parts by mass, low-temperature resistance may be insufficient, and if it exceeds 20 parts by mass, wear resistance may deteriorate. [0022]

(Metal Hydroxide)

Examples of the metal hydroxide as a flame retardant include compounds having a hydroxyl group or water of crystallization, such as magnesium hydroxide, aluminum hydroxide, calcium hydroxide, basic magnesium carbonate, hydrated aluminum silicate, and hydrated magnesium silicate, and combinations thereof. Among these, magnesium hydroxide and aluminum hydroxide are preferred and particularly magnesium hydroxide, especially magnesium hydroxide surface-treated with a fatty acid or a silane coupling agent is preferably used. The blending amount of the metal hydroxide is 1 to 45 parts by mass and preferably 20 to 30 parts by mass based on 100 parts by mass of the resins (A), (B), (C), and (D) in total. If the blending amount is less than one part by mass, peelability may be insufficient, and if it exceeds 45 parts by mass, battery fluid resistance tends to deteriorate.

(Halogen-Containing Flame Retardant)

The halogen-containing flame retardant includes bromine-containing flame retardants and chlorine-containing flame retardants and examples thereof include hexabromobenzene, ethylene bis-dibromonorbornanedicarboxyimide, ethylene bis-tetrabromophthalimide, tetrabromo-bisphenol S, tris(2,3-dibromopropyl-1)isocyanurate, hexabromocyclododecane (HBCD), octabromophenyl ether, tetrabromobisphenol A (TBA) epoxy oligomer or polymer, TBA-bis(2,3-dibromopropyl ether), chlorinated polyolefins, perchlorocyclopentadecane, decabromodiphenyloxide, polydibromophenyleneoxide, bis(tribromophenoxy)ethane, ethylene bis-pentabromobenzene, dibromoethyl-dibromocyclohexane, dibromoneopentyl glycol, tribromophenol, tribromophenol allyl ether, tetradecabromo-diphenoxybenzene, 2,2-bis(4-hydroxy-3,5-bromophenyl)propane, 2,2-bis(4-hydroxyethoxy-3,5-dibromophenyl)propane, pentabromophenol, pentabromotoluene, pentabromodiphenyl oxide, hexabromodiphenyl ether, octabromodiphenyl ether, octabromodiphenyl oxide, dibromoneopentyl glycol tetracarbonate, bis(tribromophenyl)fumaramide, N-methylhexabromo phenylamine, and combinations thereof. Among these, bromine-containing flame retardants are preferred and TBA-bis(2,3-dibromopropyl ether) is most preferred. Use of a bromine-containing flame retardant, antimony dioxide and antimony trioxide in combination can satisfy flame retardancy in a smaller blending amount. The blending amount of the halogen-containing flame retardant is 10 to 80 parts by mass, preferably 20 to 50 parts by mass based on 100 parts by mass of a polyolefin-based resin. If the blending amount is less than 10 parts by mass, flame retardancy may be insufficient and if it exceeds 80 parts by mass, flame retardancy may not be improved and other physical properties, e.g., wear resistance, may deteriorate or the flame retardant may bleed out.

In the present invention, flame retardants, flame retardant adjuvants, antioxidants, metal deactivators, antiaging agents, lubricants, fillers and reinforcing materials, UV absorbents, stabilizers, plasticizers, pigments, dyestuffs, coloring agents, antistatic agents, foaming agents, and the like may be incorporated in addition to the above-described essential components as far as the effect of the present invention is not impaired.

<Electric Cable>

The electric cable of the present invention is made by coating a conductor with a cover layer formed of the above-described non-crosslinked resin composition. That is, it is obtained by melt-mixing the above-described non-crosslinked resin composition desirably with various additives by a conventional method and then coating a conductor with the resulting composition by a conventional method using an extruder or the like. As means for mixing the composition, an apparatus capable of compounding, such as an extruder, a Henschel mixer, a kneader, a screw type kneading machine, a Banbury mixer, and a roll mill, can be used.

The electric cable of the present invention is used suitably for electric wires for automobiles, household electric wires, and the like.

EXAMPLES

The present invention is described in more detail below with reference to Examples, but the invention is not limited to the Examples.

Examples 1 to 48, Comparative Examples 1 to 9

Production of Electric Wire (Electric Cable) for Automobiles

The compositions used in Examples were prepared by kneading the respective components of the blending amounts (parts by mass) given in Tables 1 to 5 by a kneader or a screw type kneading machine, and then electric wires for automobiles were produced by using these compositions, charging them into an extruder (Diameter 60 mm, L/D=24.5, FF screw), and extruding them onto a conductor at an extrusion rate of 500 m/min and an extrusion temperature of 230 degree C. The details of the respective components in Tables 1 to 5 are as follows.

Polypropylene homopolymer: Q100f produced by SunAllomer Ltd.

Polypropylene-based modified resin: YOUMEX 1001 produced by Sanyo Chemical Industries, Ltd.

Polyolefin-based copolymer: E185GK produced by Prime Polymer Co., Ltd.

Olefin-based elastomer: Tuftec H1062 produced by Asahi Kasei Corporation

Metal hydroxide: KISUMA 5A, produced by Kyowa Chemical Industry Co., Ltd.

Halogen-containing flame retardant: FLAMECUT 121K, produced by TOSOH Corporation

TABLE 1

| | Example 1 | Example 2 | Example 3 | Example 4 | Example 5 | Example 6 |
|---|---|---|---|---|---|---|
| Components | | | | | | |
| Polyolefin homopolymer | 40 | 40 | 40 | 40 | 40 | 40 |
| Polypropylene-based modified resin | 10 | 10 | 10 | 10 | 10 | 10 |
| Polyolefin-based copolymer | 30 | 30 | 30 | 30 | 30 | 30 |
| Olefin-based elastomer | 20 | 20 | 20 | 20 | 20 | 20 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

| | Example 7 | Example 8 | Example 9 | Example 10 | Example 11 | Example 12 |
|---|---|---|---|---|---|---|
| Components | | | | | | |
| Polyolefin homopolymer | 84 | 84 | 84 | 84 | 84 | 84 |
| Polypropylene-based modified resin | 1 | 1 | 1 | 1 | 1 | 1 |
| Polyolefin-based copolymer | 10 | 10 | 10 | 10 | 10 | 10 |
| Olefin-based elastomer | 5 | 5 | 5 | 5 | 5 | 5 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

TABLE 2

| | Example 13 | Example 14 | Example 15 | Example 16 | Example 17 | Example 18 |
|---|---|---|---|---|---|---|
| Components | | | | | | |
| Polyolefin homopolymer | 65 | 65 | 65 | 65 | 65 | 65 |
| Polypropylene-based modified resin | 10 | 10 | 10 | 10 | 10 | 10 |
| Polyolefin-based copolymer | 15 | 15 | 15 | 15 | 15 | 15 |
| Olefin-based elastomer | 10 | 10 | 10 | 10 | 10 | 10 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

| | Example 19 | Example 20 | Example 21 | Example 22 | Example 23 | Example 24 |
|---|---|---|---|---|---|---|
| Components | | | | | | |
| Polyolefin homopolymer | 70 | 70 | 70 | 70 | 70 | 70 |
| Polypropylene-based modified resin | 1 | 1 | 1 | 1 | 1 | 1 |
| Polyolefin-based copolymer | 14 | 14 | 14 | 14 | 14 | 14 |
| Olefin-based elastomer | 15 | 15 | 15 | 15 | 15 | 15 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

TABLE 3

| | Example 25 | Example 26 | Example 27 | Example 28 | Example 29 | Example 30 |
|---|---|---|---|---|---|---|
| Components | | | | | | |
| Polyolefin homopolymer | 70 | 70 | 70 | 70 | 70 | 70 |
| Polypropylene-based modified resin | 5 | 5 | 5 | 5 | 5 | 5 |
| Polyolefin-based copolymer | 10 | 10 | 10 | 10 | 10 | 10 |
| Olefin-based elastomer | 15 | 15 | 15 | 15 | 15 | 15 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

| | Example 31 | Example 32 | Example 33 | Example 34 | Example 35 | Example 36 |
|---|---|---|---|---|---|---|
| Components | | | | | | |
| Polyolefin homopolymer | 58 | 58 | 58 | 58 | 58 | 58 |
| Polypropylene-based modified resin | 5 | 5 | 5 | 5 | 5 | 5 |
| Polyolefin-based copolymer | 30 | 30 | 30 | 30 | 30 | 30 |
| Olefin-based elastomer | 7 | 7 | 7 | 7 | 7 | 7 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |

TABLE 3-continued

| | | | | | | |
|---|---|---|---|---|---|---|
| Low-temperature resistance | ○ | ○ | ○ | ○ | ○ | ○ |
| Peelability | ○ | ○ | ○ | ○ | ○ | ○ |

TABLE 4

| | Example 37 | Example 38 | Example 39 | Example 40 | Example 41 | Example 42 |
|---|---|---|---|---|---|---|
| Components | | | | | | |
| Polyolefin homopolymer | 70 | 70 | 70 | 70 | 70 | 70 |
| Polypropylene-based modified resin | 5 | 5 | 5 | 5 | 5 | 5 |
| Polyolefin-based copolymer | 20 | 20 | 20 | 20 | 20 | 20 |
| Olefin-based elastomer | 5 | 5 | 5 | 5 | 5 | 5 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

| | Example 43 | Example 44 | Example 45 | Example 46 | Example 47 | Example 48 |
|---|---|---|---|---|---|---|
| Components | | | | | | |
| Polyolefin homopolymer | 65 | 65 | 65 | 65 | 65 | 65 |
| Polypropylene-based modified resin | 5 | 5 | 5 | 5 | 5 | 5 |
| Polyolefin-based copolymer | 10 | 10 | 10 | 10 | 10 | 10 |
| Olefin-based elastomer | 20 | 20 | 20 | 20 | 20 | 20 |
| Halogen-containing flame retardant | 10 | 10 | 10 | 80 | 80 | 80 |
| Metal hydroxide | 1 | 20 | 45 | 1 | 25 | 45 |
| Properties | | | | | | |
| Battery fluid resistance | ○ | ○ | ○ | ○ | ○ | ○ |
| Flame retardancy | ○ | ○ | ○ | ○ | ○ | ○ |
| Wear resistance | ○ | ○ | ○ | ○ | ○ | ○ |
| Low-temperature resistance | ○ | ○ | ○ | ○ | ○ | ○ |
| Peelability | ○ | ○ | ○ | ○ | ○ | ○ |

TABLE 5

| | Comparative Example 1 | Comparative Example 2 | Comparative Example 3 | Comparative Example 4 | Comparative Example 5 |
|---|---|---|---|---|---|
| Components | | | | | |
| Polyolefin homopolymer | 70 | 70 | 70 | 70 | 85 |
| Polypropylene-based modified resin | 5 | 5 | 5 | 5 | 0 |
| Polyolefin-based copolymer | 15 | 15 | 15 | 15 | 10 |
| Olefin-based elastomer | 10 | 10 | 10 | 10 | 5 |
| Halogen-containing flame retardant | 81 | 81 | 40 | 9 | 30 |
| Metal hydroxide | 10 | 50 | 0 | 45 | 30 |
| Properties | | | | | |
| Battery fluid resistance | ○ | x | ○ | ○ | ○ |
| Flame retardancy | ○ | ○ | ○ | x | ○ |
| Wear resistance | x | x | ○ | ○ | ○ |
| Low-temperature resistance | x | x | ○ | ○ | x |
| Peelability | ○ | ○ | x | ○ | x |

| | Comparative Example 6 | Comparative Example 7 | Comparative Example 8 | Comparative Example 9 |
|---|---|---|---|---|
| Components | | | | |
| Polyolefin homopolymer | 70 | 25 | 65 | 58 |
| Polypropylene-based modified resin | 0 | 10 | 1 | 1 |
| Polyolefin-based copolymer | 20 | 55 | 30 | 20 |
| Olefin-based elastomer | 10 | 10 | 4 | 21 |

TABLE 5-continued

|  | | | | |
|---|---|---|---|---|
| Halogen-containing flame retardant | 30 | 30 | 30 | 30 |
| Metal hydroxide | 30 | 30 | 30 | 30 |
| Properties | | | | |
| Battery fluid resistance | O | O | O | O |
| Flame retardancy | O | O | O | O |
| Wear resistance | O | X | O | X |
| Low-temperature resistance | O | O | X | O |
| Peelability | X | O | O | O |

<Evaluation of Electric Wire for Automobiles>

For the electric wires for automobiles obtained in the respective Examples and Comparative Example, the following evaluations were carried out.

(Evaluation of Wear Resistance)

Measurement was carried out by the scrape abrasion specification of ISO 6722 using a 7 Newton load, a needle having a 0.45 millimeter diameters, and an electric wire having a core wire with a cross sectional area of 0.22 square millimeters and a covering with a thickness of 0.125 millimeters, and then the number of scrapes of 100 cycles or more was considered as qualified (O), whereas the number of scrapes of less than 100 cycles was considered as disqualified (X). The results of the evaluation are shown in Tables 1 to 5.

(Evaluation of Low-Temperature Resistance)

Measurement was carried out under the low-temperature property specification of ISO 6722 where an electric cable is wound on a mandrel having a diameter of five times as large as the outer diameter of the cable in a low-temperature bath of −40 degree C., and after a visual test of an insulator, a test of voltage resistance at 1 kV was applied for one minute; a cable without occurrence of dielectric breakdown was considered as qualified (O), whereas a cable with occurrence of dielectric breakdown in the visual test or a cable with occurrence of dielectric breakdown in the voltage resistance test was considered as disqualified (X). The results of the evaluation are shown in Tables 1 to 5.

(Evaluation of Flame Retardancy)

In a flame retardancy test of ISO 6722 in which an electric cable is set at an angle of 45 degrees within a draft chamber and an inner cone flame of a Bunsen burner is removed from a test sample after a lapse of 15 seconds in the case of a cable of 2.5 mm$^2$ or thinner or after a lapse of 30 seconds in the case of a cable having a conductor size exceeding 2.5 mm$^2$, then a cable such that the flame of the insulator was extinguished completely within 70 seconds and 50 mm or longer of the insulator in the upper part of the test sample remained unburnt was considered as qualified (O), whereas a cable such that a flame continued to burn for 70 seconds of longer or the length of the insulator remaining unburnt in the test sample was shorter than 50 mm was considered as disqualified (X). The results of the evaluation are shown in Tables 1 to 5.

(Battery Fluid Resistance Test)

A test was conducted in accordance with ISO 6722. A battery fluid ($H_2SO_4$ solution) with a specific gravity of 1.260 plus or minus 0.005 was added dropwise to an insulating electric cable so that the drops might be avoided from coming into contact with each other. Subsequently, the insulating electric cable was held within an oven of 90 degree C. for 8 hours and then taken out, and thereafter battery fluid drops were added in the above-described manner and then the cable was held in the 90 degree C. oven for 16 hours. This procedure cycle was repeated two cycles in total and then the cable was left at rest at room temperature (23 degree C. plus or minus 5 degree C.) for 30 minutes. Subsequently, the cable was wound on a prescribed mandrel and the insulating coat part of the wound cable was observed visually. A voltage resistance test was carried out for a sample with which no exposure of a conductor was observed, and then a sample without discontinuation of conduction was considered as qualified ("O"). Conversely, a sample in which exposure of a conductor was observed or discontinuation of conduction occurred was considered as "X". The results of the evaluation are shown in Tables 1 to 5.

(Peelability)

Using a processing machine with a flat blade, whether peeling of a cable was easy or not, that is, whether the covering resin was cut sharply without failing to be torn due to elongation of the resin was checked. A sample that was cut sharply was evaluated as "O", whereas a sample that was not cut sharply was evaluated as "X". The results of the evaluation are shown in Tables 1 to 5.

Tables 1 to 5 show that satisfactory results were obtained in all the evaluations of battery fluid resistance, flame retardancy, wear resistance, low-temperature resistance, and peelability in Examples 1 to 48, in which the blending amounts of all components were within the ranges of the present invention, whereas at least one of the evaluation results was poor in Comparative Examples 1 to 9, in which at least one of the blending amounts of the respective components was out of the range of the present invention.

The comparison of the Examples with the Comparative Examples described above has revealed that it is essential to adjust the blending amounts of the respective components to within the ranges of blending amounts stipulated in the present invention in order to obtain satisfactory results with respect to all evaluation results.

The invention claimed is:

1. An electric cable in which a coat layer is formed of a non-crosslinked resin composition that comprises (A) 40 to 84 parts by mass of a polypropylene homopolymer, (B) 1 to 10 parts by mass of a polypropylene-based modified resin, (C) 10 to 30 parts by mass of a polyolefin-based copolymer, and (D) 5 to 20 parts by mass of an olefin-based elastomer and further comprises 1 to 30 parts by mass of a metal hydroxide and 10 to 80 parts by mass of a halogen-containing flame retardant based on 100 parts by mass of the resins (A), (B), (C), and (D) in total;
   wherein the polypropylene-based modified resin (B) has a weight average molecular weight of 15,000 to 50,000.

2. The electric cable according to claim 1, wherein the polypropylene-based modified resin (B) is one prepared by graft-copolymerizing maleic anhydride to a polypropylene-based resin.

3. The electric cable according to claim 2, wherein the maleic anhydride has an acid value (JIS K0070) of 15 to 55.

4. The electric cable according to claim 1, wherein the polyolefin-based copolymer (C) is a block copolymer of a propylene homopolymer with ethylene or 1-butene.

5. The electric cable according to claim 1, wherein the metal hydroxide is magnesium hydroxide.

6. The electric cable according to claim 5, wherein the magnesium hydroxide is magnesium hydroxide surface-treated with a fatty acid or a silane coupling agent.

7. The electric cable according to claim 1, wherein the halogen-containing flame retardant is a bromine-containing flame retardant.

8. The electric cable according to claim 7, wherein the bromine-containing flame retardant is tetrabromobisphenol A-bis(2,3-dibromopropyl ether).

* * * * *